US005219547A

United States Patent [19]
Hellring et al.

[11] Patent Number: 5,219,547
[45] Date of Patent: Jun. 15, 1993

[54] SYNTHESIS OF CRYSTALLINE MORDENITE-TYPE MATERIAL

[75] Inventors: Stuart D. Hellring, Yardley, Pa.; Randy F. Striebel, Mt. Holly, N.J.

[73] Assignee: Mobil Oil Corp., Fairfax, Va.

[21] Appl. No.: 771,675

[22] Filed: Oct. 4, 1991

[51] Int. Cl.$^5$ .................. C01B 33/34; B01J 29/28
[52] U.S. Cl. ............................ 423/708; 423/709; 502/62; 502/78
[58] Field of Search ............ 423/708, 709, 328.2, 423/329.1, 700; 502/62, 78

[56] References Cited

U.S. PATENT DOCUMENTS

| | | | |
|---|---|---|---|
| 3,334,964 | 8/1967 | Reid, Jr. | 423/700 |
| 3,531,243 | 9/1970 | Aitken et al. | 423/700 |
| 3,758,667 | 9/1973 | Kouwenhoven et al. | 423/700 |
| 3,996,337 | 12/1976 | Stabenow et al. | 423/328 |
| 4,376,104 | 3/1983 | Ball et al. | 423/329 |
| 4,377,502 | 3/1983 | Klotz | 252/455 Z |
| 4,390,457 | 6/1983 | Klotz | 252/455 Z |
| 4,503,023 | 3/1985 | Breck et al. | 423/328 |
| 4,511,547 | 4/1985 | Iwayama et al. | 423/329 |
| 4,581,216 | 4/1986 | Iwayama et al. | 423/329 |
| 4,585,640 | 4/1986 | Desmond et al. | 423/329 |
| 4,707,345 | 11/1987 | Lok et al. | 423/326 |
| 4,788,380 | 11/1988 | Lok et al. | 585/820 |
| 4,935,217 | 6/1990 | Simpson | 423/700 |

OTHER PUBLICATIONS

Jacobs, P. A. et al., "Synthesis of High-Silica Aluminosilicate Zeolites," *Studies in Surface Science and Catalysis*, vol. 33, p. 12 (1987).

Breck, D. W., *Zeolite Molecular Sieves*, pp. 162-163 (1974).

Lok, B. M. et al., "The Role of Organic Molecules in Molecular Sieve Synthesis", *Zeolites*, pp. 282-291 (1983).

*Primary Examiner*—Carl F. Dees
*Attorney, Agent, or Firm*—Alexander J. McKillop; Dennis P. Santini

[57] ABSTRACT

This invention relates to a new form of crystalline material identified as mordenite-type, to a new and useful method for synthesizing said crystalline material and to use of said crystalline material prepared in accordance herewith as a catalyst for organic compound, e.g. hydrocarbon compound, conversion.

17 Claims, No Drawings

SYNTHESIS OF CRYSTALLINE MORDENITE-TYPE MATERIAL

BACKGROUND OF THE INVENTION

1. Field of the Invention

This invention relates to a new and useful method for synthesizing a highly siliceous form of crystalline material identified as mordenite-type, the new material synthesized, and use of the crystalline material synthesized in accordance herewith as a catalyst component for organic compound, e.g. hydrocarbon compound, conversion.

More particularly, this invention relates to a method for preparing the crystalline mordenite-type structure whereby synthesis is facilitated and reproducible and the product exhibits high purity and catalytic utility.

2. Discussion of the Prior Art

Mordenite is a naturally occurring zeolite with an intersecting 12-ring by 8-ring structure. Without an organic directing agent, mordenite typically crystallizes at silica/alumina mole ratios of about 5 to 10 (D. W. Breck, *Zeolite Molecular Sieves*, 162–163, (1974)). U.S. Pat. Nos. 3,996,337; 4,503,023; 4,511,547 and 4,581,216 show synthesis of mordenite without a directing agent. U.S. Pat. No. 4,377,502 teaches synthesis of mordenite from a reaction mixture comprising a directing agent of triethanolamine, 2-amino-2-ethyl-1,3-propanediol, dioxane or morpholine. U.S. Pat. No. 4,585,640 shows methyl violet 2B, methylene blue, methyl viologen or methyl green used as directing agent for mordenite synthesis. U.S. Pat. No. 4,376,104 teaches a method for synthesis of mordenite from a reaction mixture comprising 3-dimethylamino-2,2-dimethylpropanol or N,N,2,2-tetramethylpropan-1,3-diamine as directing agent. Piperidine is disclosed as an organic directing agent for mordenite synthesis by P. A. Jacobs and J. A. Martens, *Studies of Surface Science and Catalysis*, 33, 12 (1987); and 2-amino-pyridine is taught for this purpose in U.S. Pat. No. 4,390,457. Tetra-n-propylammonium salts are taught to be mordenite directing agents in U.S. Pat. Nos. 4,707,345 and 4,788,380.

The above disclosures are incorporated herein by reference as to mordenite and its synthesis.

Various organic directing agents are taught for synthesis of various crystalline materials. For example, U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonium hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Lok et al. (3 *Zeolites*, 282–291 (1983)) teach numerous organic compounds which act as directing agents for synthesis of various crystalline materials, such as, for example, ZSM-5, ZSM-11, ZSM-12, ZSM-20, ZSM-35, ZSM-48, AlPO$_4$-5, AlPO$_4$-8, AlPO$_4$-20 and others. The article does not show the presently required organic for synthesis of mordenite. The article does show that cyclohexylamine, N-methylcyclohexylamine, dicyclohexylamine and ethyl-n-butylamine may direct synthesis of AlPO$_4$-5 (U.S. Pat. No. 4,310,440).

U.S. Pat. No. 4,251,499 teaches a method for synthesizing ferrierite from a particular reaction mixture containing piperidine or alkyl-substituted piperidine, e.g. 1,2-dimethylpiperidine, as directing agent. U.S. Pat. Nos. 4,016,245 and 4,107,195 show synthesis of ZSM-35 from a reaction mixture containing pyrrolidine directing agent.

The zeolitic compositions labeled PSH-3 in U.S. Pat. No. 4,439,409 are synthesized from reaction mixtures containing hexamethyleneimine as directing agent. U.S. Pat. No. 4,954,325 utilizes hexamethyleneimine in another reaction mixture to direct synthesis of MCM-22. That organic is used in U.S. Pat. No. 4,981,663 for synthesis of yet another crystalline structure labelled MCM-35.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of (CH$_3$)$_2$(C$_2$H$_5$)N$^+$(CH$_2$)$_4$N$^+$(C$_2$H$_5$)(CH$_3$)$_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4, 5, 6 or 10, directing agent; and U.S. Pat. No. 4,539,193, teaching use of bis (dimethylpiperidinium) trimethylene directing agent for synthesis of ZSM-12.

Various diquaternary ammonium compounds have been identified as directing agents for a particular assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. (CH$_3$)$_3$N$^+$(R)N$^+$(CH$_3$)$_3$, where R is a saturated or unsaturated hydrocarbon having 7 carbon atoms. U.S. Pat. No. 4,665,250 teaches the use of linear diquaternary ammonium compounds of the structure (CH$_3$)$_3$N$^+$(CH$_2$)$_m$N$^+$(CH$_3$)$_3$, m being 5, 6, 8, 9 or 10, for synthesis of ZSM-48. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_3)_3$ to direct synthesis of a Silica-X structure-type. U.S. Pat. No. 4,585,639 teaches use of the diquaternary $(C_2H_5)(CH_3)_2N^+(CH_2)_{4or6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 (synthesized with dibenzyldimethylammonium directing agent) have the same structure.

Applicants know of no prior art method for preparing a highly siliceous crystalline mordenite structure utilizing the present method.

SUMMARY OF THE INVENTION

An economical and reproducible method for preparing a crystalline material identified as synthetic mordenite exhibiting high purity, catalytic activity and other valuable properties is provided. The method comprises forming a reaction mixture hydrogel containing sources of alkali or alkaline earth metal (M) cations; an oxide of trivalent element (X), e.g. aluminum, boron, iron, gallium, indium and mixtures thereof; an oxide of tetravalent element (Y), e.g. silicon, germanium, tin and mixtures thereof; a directing agent (R) of 1,8-diamino-p-menthane; and water, said reaction mixture having a composition in terms of mole ratios, within the following ranges:

| Reactants | Useful | Preferred |
| --- | --- | --- |
| $YO_2/X_2O_3$ | 1 to 70 | 10 to 30 |
| $H_2O/YO_2$ | 10 to 100 | 15 to 50 |
| $OH^-/YO_2$ | 0 to 0.25 | 0 to 0.1 |
| $M/YO_2$ | 0 to 2.0 | 0.10 to 1.0 |
| $R/YO_2$ | 0.10 to 2.0 | 0.16 to 1.0 |

The method further comprises maintaining the reaction mixture until crystals of mordenite structure are formed. Reaction conditions required consist of heating the foregoing reaction mixture to a temperature of from about 100° C. to about 200° C. for a period of time of from about 10 hours to about 10 days. A more preferred temperature range is from about 130° C. to about 180° C. with the amount of time at a temperature in such range being from about 2 days to about 8 days.

The solid product comprising mordenite crystals is recovered from the reaction medium, as by cooling the whole to room temperature, filtering and water washing.

EMBODIMENTS

The particular effectiveness of the presently required organic directing agent, i.e. 1,8-diamino-p-menthane, when compared with other directing agents, such as those identified above, for the present synthesis is believed due to its ability to function as a template in the nucleation and growth of mordenite crystals from the above low $YO_2$, e.g. $SiO_2$, low alkalinity, e.g. low $OH^-/YO_2$, reaction mixture. This is true even though no predigestion of the gel is required prior to crystallization. This different organic agent functions in this fashion in the reaction mixture having the above described composition and under the above described conditions of temperature and time. The reaction mixture required for this invention is X-rich, e.g. aluminum-rich, with a $YO_2/X_2O_3$ molar ratio of from about 1/1 to about 70/1, preferably from about 10/1 to about 30/1.

It should be noted that the ratio of components of the reaction mixture required herein are critical to achieve maximum effectiveness. For instance, if the $YO_2/X_2O_3$ ratio is above about 30, especially above about 70, something other than mordenite will begin to form as impurity. In general, with higher $YO_2/X_2O_3$ ratios in the reaction mixture, crystallization of synthetic ZSM-5 increases and mordenite decreases. When the $YO_2/X_2O_3$ ratio is greater than about 70/1, ZSM-5 becomes the primary product. Further, at these lower $YO_2/X_2O_3$ molar ratios, i.e. less than about 30/1, the $R/YO_2$ mole ratio minimum for most successful mordenite synthesis is about 0.16/1. When this ratio drops below about 0.16 at the $YO_2/X_2O_3$ ratios of 30 or less, mixtures of mordenite and ZSM-5 comprise the product. Still further, for most effective synthesis of mordenite by this method, the reaction temperature should not exceed about 180° C.

The synthesis of the present invention is facilitated when the reaction mixture comprises seed crystals, such as those having the structure of mordenite. The use of at least 0.01%, preferably about 0.10%, and even more preferably about 1% seed crystals (based on total weight) of crystalline material will be useful.

The reaction mixture composition for the synthesis of mordenite-type crystals hereby can be prepared utilizing materials which can supply the appropriate oxide. The useful sources of $X_2O_3$, e.g. aluminum oxide, iron oxide and/or boron oxide, include, as non-limiting examples, any known form of such oxide, e.g. aluminum oxide or hydroxide, organic or inorganic salt or compound, e.g. alumina, aluminates and borates. The useful sources of $YO_2$, e.g. silicon oxide, include, as non-limiting examples, known forms of such oxide, e.g. silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the mordenite crystals will vary with the exact nature of the reaction mixture employed within the above limitations.

The 1,8-diamino-p-menthane directing agent for use herein has a formula $C_{10}H_{22}N_2$, and may be structurally represented as follows:

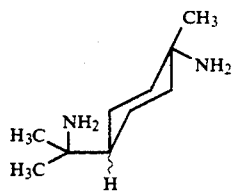

The mordenite crystal composition prepared hereby has a characteristic X-ray diffraction pattern, including values substantially as set forth in Table 1, hereinafter.

TABLE 1

| Interplanar d-Spacing, (A) | Relative Intensity (I/I$_o$) |
|---|---|
| 13.59 ± 0.10 | m |
| 10.23 ± 0.10 | w-m |
| 9.05 ± 0.10 | s-vs |
| 6.57 ± 0.10 | s |
| 6.39 ± 0.06 | w |
| 6.06 ± 0.05 | w |
| 5.80 ± 0.03 | w-m |
| 4.50 ± 0.05 | m-s |
| 4.25 ± 0.15 | w |
| 4.00 ± 0.05 | s-vs |
| 3.83 ± 0.02 | w-m |
| 3.76 ± 0.02 | w |
| 3.47 ± 0.04 | vs |
| 3.41 ± 0.03 | s} twin peaks |
| 3.38 ± 0.03 | s} not fully resolved |
| 3.22 ± 0.03 | m-s |
| 2.89 ± 0.02 | w-m |

These X-ray diffraction data were collected with a Rigaku diffraction system, equipped with a graphite diffracted beam monochromator and scintillation counter, using copper K-alpha radiation. The diffraction data were recorded by step-scanning at 0.02 degrees of two-theta, where theta is the Bragg angle, and a counting time of 1 second for each step. The interplanar spacings, d's, were calculated in Angstrom units (A), and the relative intensities of the lines I/I$_o$, where I$_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs = very strong (75–100), s = strong (50–74), m = medium (25–49) and w = weak (0–24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline mordenite prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is from about 1 to about 70, usually from about 10 to about 50, more usually from about 20 to about 30. In the as-synthesized form, the crystalline material has a formula, on an anhydrous basis and in terms of moles of oxides per y moles of YO$_2$, as follows:

$$(0.1 \text{ to } 1.1)M_2O:(0.1 \text{ to } 1.1)R:X_2O_3:(y)YO_2$$

wherein M and R are as defined above. The M and R components are associated with the material as a result of their presence during crystallization, and are easily removed by post-crystallization methods hereinafter more particularly described.

Synthetic mordenite-type crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenationdehydrogenation function is to be performed. Such components can be exchanged into the composition, impregnated therein or physically intimately admixed therewith. Such components can be impregnated in or on to the mordenite such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic mordenite crystals, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized mordenite can be prepared by heating same at a temperature of from about 200° C. to about 550° C. for from 1 hour to about 48 hours.

The original cations, e.g. alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements, especially gallium, indium and tin.

Typical ion exchange technique would be to contact the synthetic mordenite material with a salt of the desired replacing cation or cations. Examples of such salts include the halides, e.g. chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the mordenite is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline mordenite prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline material can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina, titania and/or zirconia. The latter may be either naturally occurring or in the form of gelatinous precipitates, sols or gels including mixtures of silica and metal oxides. Use of a material in conjunction with the mordenite, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalytically active form of the catalyst of this invention which may contain additional hydrogenation components, reforming stocks can be reformed employing a temperature between about 370° C. and about 540° C. The pressure can be between about 100 psig and about 1000 psig, but it is preferably between about 200 psig and about 700 psig. The liquid hourly space velocity is generally between about 0.1 and about 10 hr$^{-1}$, preferably between about 0.5 and about 4 hr$^{-1}$, and the hydrogen to hydrocarbon mole ratio is generally between about 1 and about 20, preferably between about 4 and about 12.

The catalyst can also be used for hydroisomerization of normal paraffins, when provided with a hydrogenation component, e.g. platinum. Hydroisomerization is carried out at a temperature between about 90° C. and 375° C., preferably about 145° C. to about 290° C., with a liquid hourly space velocity between about 0.01 and about 2 hr$^{-1}$, preferably between about 0.25 and about 0.50 hr$^{-1}$, employing hydrogen such that the hydrogen to hydrocarbon mole ratio is between about 1:1 and about 5:1.

The catalyst can also be used for reducing the pour point of gas oils. This reaction may be conducted at a liquid hourly space velocity between about 10 and about 30 hr$^{-1}$ and at a temperature between about 400° C. and about 540° C.

Other reactions which can be accomplished employing the catalyst of this invention containing a metal, e.g. platinum, include hydrogenation-dehydrogenation reactions and desulfurization reactions.

In order to more fully illustrate the nature of the invention and the manner of practicing same, the following examples are presented. In the examples, whenever adsorption data are set forth for comparison of sorptive capacities, they are determined as follows:

A weighed sample of the calcined adsorbant is contacted with the desired pure adsorbate vapor in an adsorption chamber, evacuated to 1 mm and contacted with either 5 mm or 12 mm Hg of water vapor, 20 mm Hg of n-hexane or cyclohexane vapor, or 100mm Hg of n-butane or neopentane vapor, pressures less than the vapor-liquid equilibrium pressure of the respective adsorbate at room temperature. The pressure is kept constant (within about ±0.5 mm) by addition of absorbate vapor controlled by a manostat during the adsorption period, which does not exceed about 8 hours. As adsorbate is adsorbed by the sorbant material, the decrease in pressure causes the manostat to open a valve which admits more adsorbate vapor to the chamber to restore the above control pressures. Sorption is complete when the pressure change is not sufficient to activate the manostat. The increase in weight is calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

To water (47.21 g) was added sodium aluminate (1.45 g, technical grade, 74% solids), and sodium hydroxide (0.535 g). This mixture was stirred briefly to complete dissolution, then 1,8-diamino-p-menthane (7.508 g) was added. To this solution was added silica (Ultrasil, 9.137 g), and the resulting gel was transferred to a teflon liner, placed in an autoclave, pressurized (100 psig), sealed, then heated (145° C.) with stirring (~345 rpm) for 1 week. The final hydrogel is described by the mole ratios as follows:

| | |
|---|---|
| $SiO_2/Al_2O_3$ | 21.27 |
| $OH^-/SiO_2$ | 0 |
| $R/SiO_2$ | 0.31 |
| $H_2O/SiO_2$ | 19.03 |
| $Na^+/SiO_2$ | 0.2 |

After cooling, the product was suction filtered, washed with water, then dried (110° C., in vacuo) to give a white powder (8.687 g). The X-ray diffraction pattern ($\lambda = 1.5418$) of the product proved it to be mordenite, and is shown in Table 2.

A portion of the as-synthesized product of this example was calcined at 538° C. for 10 hours. Table 3 shows the X-ray diffraction pattern of this calcined mordenite material.

TABLE 2

| Interplanar d-Spacing (A) | Degrees 2-Theta | Relative Intensity |
|---|---|---|
| 13.60 | 6.50 | 40.83 |
| 10.26 | 8.62 | 17.82 |
| 9.08 | 9.74 | 85.49 |
| 6.58 | 13.46 | 68.57 |
| 6.40 | 13.84 | 17.99 |
| 6.21 | 14.26 | 6.43 |
| 6.06 | 14.62 | 14.95 |
| 5.81 | 15.26 | 32.58 |
| 4.87 | 18.20 | 5.84 |
| 4.52 | 19.62 | 63.84 |
| 4.45 | 19.96 | 7.73 |
| 4.11 | 21.44 | 10.03 |
| 3.99 | 22.28 | 92.29 |
| 3.83 | 23.22 | 24.49 |
| 3.76 | 23.68 | 13.96 |
| 3.62 | 24.58 | 6.45 |
| 3.47 | 25.68 | 100.00 |
| 3.39 | 26.32 | 57.10 |
| 3.22 | 27.66 | 62.00 |
| 3.16 | 28.28 | 7.68 |
| 3.15 | 28.36 | 7.68 |
| 3.10 | 28.82 | 9.08 |
| 2.93 | 30.48 | 10.55 |
| 2.89 | 30.96 | 24.30 |
| 2.70 | 33.20 | 6.66 |

TABLE 3

| Interplanar d-Spacing (A) | Degrees 2-Theta | Relative Intensity |
|---|---|---|
| 13.64 | 6.48 | 35.18 |
| 10.23 | 8.64 | 24.94 |
| 9.10 | 9.72 | 100.00 |
| 6.58 | 13.46 | 72.44 |
| 6.39 | 13.86 | 21.64 |
| 6.18 | 14.34 | 7.39 |
| 6.06 | 14.62 | 16.88 |
| 5.81 | 15.26 | 29.27 |

TABLE 3-continued

| Interplanar d-Spacing (A) | Degrees 2-Theta | Relative Intensity |
|---|---|---|
| 5.11 | 17.36 | 7.26 |
| 5.03 | 17.62 | 7.21 |
| 4.52 | 19.64 | 49.57 |
| 4.15 | 21.42 | 6.75 |
| 3.99 | 22.30 | 87.28 |
| 3.83 | 23.24 | 22.85 |
| 3.75 | 23.72 | 14.89 |
| 3.63 | 24.52 | 7.59 |
| 3.57 | 24.94 | 6.85 |
| 3.47 | 25.68 | 93.85 |
| 3.38 | 26.34 | 62.04 |
| 3.22 | 27.68 | 63.59 |
| 3.15 | 28.34 | 9.88 |
| 3.10 | 28.82 | 9.60 |
| 2.93 | 30.48 | 11.15 |
| 2.89 | 30.94 | 25.77 |
| 2.70 | 33.16 | 6.48 |
| 2.69 | 33.32 | 6.52 |

The hydrogen-ion form of the calcined product of this example proves to have an Alpha Value of 430, and the following equilibrium adsorption capacities in grams/100 grams:

| | |
|---|---|
| $H_2O$ | 13.6 |
| Neopentane | 4.6 |
| n-Butane | 5.3 |

EXAMPLE 2

To water (47.227 g) was added sodium aluminate (1.44 g, technical grade, 74% solids) and sodium hydroxide (0.541 g). This mixture was stirred briefly to complete dissolution, then 1,8-diamino-p-methane (7.509 g) was added. To this solution was added silica (Ultrasil, 9.116 g), and the resulting gel was transferred to a teflon liner, placed in an autoclave, pressurized (100 psig), sealed, then heated (175° C.) with stirring (~355 rpm) for 3 days. The final hydrogel had the following composition in terms of mole ratios:

| | |
|---|---|
| $SiO_2/Al_2O_3$ | 21.41 |
| $OH^-/SiO_2$ | 0 |
| $R/SiO_2$ | 0.31 |
| $H_2O/SiO_2$ | 19.08 |
| $Na^+/SiO_2$ | 0.20 |

After cooling, the product was suction filtered, washed with water, then dried (110° C., in vacuo) to give a white powder (9.007 g). The X-ray diffraction pattern ($\lambda = 1.5418$) of the product proved it to be synthetic mordenite as shown in Table 4.

A portion of the as-synthesized product of this example was calcined at 538° C. for 10 hours. Table 5 shows the X-ray diffraction pattern of this calcined mordenite material.

TABLE 4

| Interplanar d-Spacing (A) | Degrees 2-Theta | Relative Intensity |
|---|---|---|
| 13.64 | 6.48 | 39.81 |
| 10.28 | 8.60 | 17.89 |
| 9.10 | 9.72 | 68.71 |
| 6.58 | 13.46 | 56.39 |
| 6.40 | 13.84 | 19.95 |
| 6.24 | 14.20 | 5.20 |
| 6.06 | 14.62 | 13.30 |
| 5.81 | 15.26 | 26.74 |

TABLE 4-continued

| Interplanar d-Spacing (A) | Degrees 2-Theta | Relative Intensity |
|---|---|---|
| 5.04 | 17.58 | 4.87 |
| 4.87 | 18.20 | 5.62 |
| 4.52 | 19.62 | 58.92 |
| 4.27 | 20.80 | 6.14 |
| 4.23 | 21.00 | 6.00 |
| 4.15 | 22.40 | 10.82 |
| 4.10 | 21.70 | 7.96 |
| 3.99 | 22.26 | 100.00 |
| 3.83 | 23.20 | 22.34 |
| 3.75 | 23.70 | 12.22 |
| 3.62 | 24.60 | 5.57 |
| 3.57 | 24.92 | 4.73 |
| 3.53 | 25.26 | 10.21 |
| 3.47 | 25.66 | 83.04 |
| 3.39 | 26.32 | 58.41 |
| 3.28 | 27.16 | 8.34 |
| 3.22 | 27.66 | 49.70 |
| 3.15 | 28.34 | 6.84 |
| 3.10 | 28.76 | 7.82 |
| 2.94 | 30.42 | 9.70 |
| 2.89 | 30.92 | 20.66 |
| 2.71 | 33.10 | 5.53 |
| 2.70 | 33.22 | 6.56 |
| 2.57 | 34.97 | 4.87 |

TABLE 5

| Interplanar d-Spacing (A) | Degrees 2-Theta | Relative Intensity |
|---|---|---|
| 13.64 | 6.48 | 32.69 |
| 10.26 | 8.62 | 24.03 |
| 9.10 | 9.72 | 79.00 |
| 6.58 | 13.46 | 61.57 |
| 6.39 | 13.86 | 24.63 |
| 6.06 | 14.62 | 15.25 |
| 5.81 | 15.26 | 24.71 |
| 5.11 | 17.34 | 5.55 |
| 5.03 | 17.62 | 6.17 |
| 4.86 | 18.26 | 4.97 |
| 4.52 | 19.62 | 47.19 |
| 4.27 | 20.80 | 6.03 |
| 4.22 | 21.04 | 6.20 |
| 4.14 | 21.44 | 7.51 |
| 4.10 | 21.68 | 7.92 |
| 3.99 | 22.30 | 100.00 |
| 3.83 | 23.22 | 22.65 |
| 3.75 | 23.70 | 12.74 |
| 3.62 | 24.56 | 6.49 |
| 3.57 | 24.94 | 5.09 |
| 3.47 | 25.68 | 83.32 |
| 3.38 | 26.34 | 67.17 |
| 3.29 | 27.14 | 8.55 |
| 3.22 | 27.66 | 54.82 |
| 3.15 | 28.30 | 8.26 |
| 3.10 | 28.82 | 8.89 |
| 2.94 | 30.44 | 10.89 |
| 2.89 | 30.98 | 23.55 |
| 2.69 | 33.34 | 5.89 |
| 2.63 | 34.12 | 4.63 |

The hydrogen-ion form of the calcined product of this example proves to have an Alpha Value of about 430, and the following equilibrium adsorption capacities in grams/100 grams:

| | |
|---|---|
| $H_2O$ | 13.6 |
| Neopentane | 4.6 |
| n-Butane | 5.3 |

EXAMPLE 3

To water (47.222 g) was added sodium aluminate (0.28 g, technical grade, 74% solids) and sodium hydroxide (0.543 g). This mixture was stirred briefly to complete dissolution, then 7.558 g of 1,8-diamino-p-menthane was added. To this solution was added silica (Ultrasil, 9.146 g), and the resulting gel was transferred to a teflon liner, placed in an autoclave, pressurized (100 psig), sealed, then heated (145° C.) with stirring (~360 rpm) for 1 week. The final hydrogel had the following composition in terms of mole ratios:

| | |
|---|---|
| $SiO_2/Al_2O_3$ | 103.39 |
| $OH^-/SiO_2$ | 0.08 |
| $R/SiO_2$ | 0.32 |
| $H_2O/SiO_2$ | 18.90 |
| $Na^+/SiO_2$ | 0.12 |

After cooling, the product was suction filtered, washed with water, then dried (110° C., in vacuo) to give a white powder (8.811 g). The X-ray diffraction pattern ($\lambda = 1.5418$) of the product proved it to be synthetic ZSM-5 with amorphous impurity, instead of mordenite, as shown in Table 6.

A portion of the as-synthesized product of this example was calcined at 538° C. for 10 hours. Table 7 shows the X-ray diffraction pattern of this calcined product material.

TABLE 6

| Interplanar d-Spacing (A) | Degrees 2-Theta | Relative Intensity |
|---|---|---|
| 20.27 | 4.36 | 54.04 |
| 11.22 | 7.88 | 71.60 |
| 10.03 | 8.82 | 47.84 |
| 7.49 | 11.82 | 14.95 |
| 7.34 | 12.06 | 10.59 |
| 7.09 | 12.48 | 10.72 |
| 6.74 | 13.14 | 13.52 |
| 6.40 | 13.84 | 16.16 |
| 6.03 | 14.70 | 18.01 |
| 5.73 | 15.46 | 14.83 |
| 5.60 | 15.82 | 17.38 |
| 5.39 | 16.44 | 9.63 |
| 5.16 | 17.20 | 11.84 |
| 5.00 | 17.72 | 16.75 |
| 4.85 | 18.30 | 9.52 |
| 4.63 | 19.16 | 14.34 |
| 4.46 | 19.90 | 9.81 |
| 4.39 | 20.24 | 18.49 |
| 4.28 | 20.74 | 17.34 |
| 4.19 | 21.22 | 9.27 |
| 4.11 | 21.62 | 12.22 |
| 4.02 | 22.12 | 13.66 |
| 3.87 | 22.98 | 100.00 |
| 3.84 | 23.18 | 71.27 |
| 3.74 | 23.82 | 52.71 |
| 3.67 | 24.28 | 34.30 |
| 3.62 | 24.62 | 17.00 |
| 3.56 | 24.98 | 16.70 |
| 3.45 | 25.80 | 76.51 |
| 3.37 | 26.44 | 32.00 |
| 3.35 | 26.58 | 31.73 |
| 3.33 | 26.74 | 31.83 |
| 3.26 | 27.38 | 25.76 |
| 3.23 | 27.62 | 30.18 |
| 3.06 | 29.16 | 16.89 |
| 3.00 | 29.76 | 18.47 |
| 2.99 | 29.92 | 19.95 |
| 2.95 | 30.26 | 14.41 |

TABLE 7

| Interplanar d-Spacing (A) | Degrees 2-Theta | Relative Intensity |
|---|---|---|
| 17.89 | 4.94 | 31.42 |
| 11.25 | 7.86 | 78.05 |
| 10.10 | 8.76 | 54.45 |
| 8.69 | 10.18 | 16.96 |
| 7.39 | 11.98 | 17.16 |

TABLE 7-continued

| Interplanar d-Spacing (A) | Degrees 2-Theta | Relative Intensity |
|---|---|---|
| 6.74 | 13.14 | 17.64 |
| 6.38 | 13.88 | 23.79 |
| 6.04 | 14.66 | 27.45 |
| 5.72 | 15.48 | 21.30 |
| 5.60 | 15.82 | 22.69 |
| 5.39 | 16.44 | 12.54 |
| 5.17 | 17.16 | 14.52 |
| 4.99 | 17.76 | 18.66 |
| 4.91 | 18.08 | 13.27 |
| 4.80 | 18.48 | 12.45 |
| 4.63 | 19.16 | 18.80 |
| 4.38 | 20.28 | 24.19 |
| 4.28 | 20.74 | 24.11 |
| 4.10 | 21.66 | 21.41 |
| 4.02 | 22.12 | 20.87 |
| 3.87 | 23.00 | 100.00 |
| 3.83 | 23.22 | 76.23 |
| 3.73 | 23.86 | 58.16 |
| 3.66 | 24.34 | 38.75 |
| 3.41 | 26.12 | 93.31 |
| 3.26 | 27.40 | 19.04 |
| 3.19 | 27.98 | 15.80 |
| 3.15 | 28.34 | 15.36 |
| 3.06 | 29.18 | 19.80 |
| 3.00 | 29.80 | 21.70 |
| 2.86 | 31.22 | 12.01 |
| 2.74 | 32.70 | 11.64 |

The hydrogen-ion form of the calcined product of this example proves to have an Alpha Value of 100, and the following equilibrium adsorption capacities in grams/100 grams:

| H$_2$O | 7.2 |
|---|---|
| Cyclohexane | 7.8 |
| n-Hexane | 11.1 |

EXAMPLE 4

To water (47.216 g) was added sodium aluminate (1.45 g, technical grade, 74% solids) and sodium hydroxide (0.544 g). This mixture was stirred briefly to complete dissolution, then 1,8-diamino-p-menthane (3.774 g) was added. To this solution was added silica (Ultrasil, 9.148 g), and the resulting gel was transferred to a teflon liner, placed in an autoclave, pressurized (100 psig), sealed, then heated (145° C.) with stirring (~360 rpm) for 1 week. The final hydrogel is described by the moles ratios as follows:

| SiO$_2$/Al$_2$O$_3$ | 21.27 |
|---|---|
| OH$^-$/SiO$_2$ | 0 |
| R/SiO$_2$ | 0.16 |
| H$_2$O/SiO$_2$ | 19.01 |
| Na$^+$/SiO$_2$ | 0.20 |

After cooling, the product was suction filtered, washed with water, then dried (110° C., in vacuo) to give a white powder (8.313 g). The X-ray diffraction pattern ($\lambda = 1.5418$) of the product proved it to be a mixture of ZSM-5 and mordenite, as shown in Table 8.

TABLE 8

| Interplanar d-Spacing (A) | Degrees 2-Theta | Relative Intensity |
|---|---|---|
| 13.43 | 6.58 | 28.25 |
| 11.14 | 7.94 | 13.62 |
| 10.09 | 8.76 | 14.49 |

TABLE 8-continued

| Interplanar d-Spacing (A) | Degrees 2-Theta | Relative Intensity |
|---|---|---|
| 9.41 | 9.40 | 70.37 |
| 9.01 | 9.82 | 69.90 |
| 7.01 | 12.62 | 19.11 |
| 6.90 | 12.82 | 18.69 |
| 6.54 | 13.54 | 55.19 |
| 6.35 | 13.94 | 11.54 |
| 6.02 | 14.72 | 11.30 |
| 5.76 | 15.38 | 28.18 |
| 5.64 | 15.70 | 8.87 |
| 5.01 | 17.70 | 5.81 |
| 4.85 | 18.30 | 5.51 |
| 4.72 | 18.78 | 4.78 |
| 4.50 | 19.72 | 39.87 |
| 4.36 | 20.36 | 4.41 |
| 4.26 | 20.86 | 4.51 |
| 4.21 | 21.10 | 4.64 |
| 4.12 | 22.58 | 8.05 |
| 3.97 | 22.38 | 81.83 |
| 3.92 | 22.68 | 23.41 |
| 3.82 | 23.28 | 35.05 |
| 3.76 | 23.64 | 34.03 |
| 3.72 | 23.92 | 19.18 |
| 3.65 | 24.38 | 21.54 |
| 3.52 | 25.28 | 45.19 |
| 3.46 | 25.78 | 100.00 |
| 3.37 | 26.42 | 43.24 |
| 3.30 | 27.00 | 13.98 |
| 3.21 | 27.80 | 46.61 |
| 3.12 | 28.60 | 18.25 |
| 3.04 | 29.40 | 14.72 |
| 2.99 | 29.86 | 5.09 |
| 2.98 | 30.00 | 5.81 |
| 2.94 | 30.36 | 9.69 |
| 2.92 | 30.60 | 10.17 |
| 2.88 | 31.04 | 22.05 |
| 2.70 | 33.18 | 8.38 |
| 2.64 | 33.96 | 6.19 |
| 2.62 | 34.22 | 4.63 |
| 2.58 | 34.84 | 5.75 |

EXAMPLE 5

To water (47.232 g) was added sodium aluminate (0.29 g, technical grade, 74% solids) and sodium hydroxide (0.52 g). This mixture was stirred briefly to complete dissolution, then 1,8-diamino-p-menthane (7.542 g) was added. To this solution was added silica (Ultrasil, 9.129 g), and the resulting gel was transferred to a teflon liner, placed in an autoclave, pressurized (100 psig), sealed, then heated (175° C.) with stirring (~360 rpm) for 3 days. The final hydrogel is described by the moles ratios as follows:

| SiO$_2$/Al$_2$O$_3$ | 102.87 |
|---|---|
| OH$^-$/SiO$_2$ | 0.07 |
| R/SiO$_2$ | 0.32 |
| H$_2$O/SiO$_2$ | 18.94 |
| Na$^+$/SiO$_2$ | 0.12 |

After cooling, the product was suction filtered, washed with water, then dried (110° C., in vacuo) to give a white powder (8.388 g). The X-ray diffraction pattern ($\lambda = 1.5418$) of the product proved it to be devoid of any mordenite, but to comprise a layered material and amorphous material, and is shown in Table 9.

TABLE 9

| Interplanar d-Spacing (A) | Degrees 2-Theta | Relative Intensity |
|---|---|---|
| 20.45 | 4.32 | 78.40 |

TABLE 9-continued

| Interplanar d-Spacing (A) | Degrees 2-Theta | Relative Intensity |
|---|---|---|
| 13.68 | 6.46 | 18.28 |
| 11.22 | 7.88 | 19.32 |
| 10.07 | 8.78 | 26.65 |
| 9.04 | 9.78 | 20.05 |
| 7.34 | 12.06 | 14.42 |
| 6.59 | 13.44 | 21.54 |
| 6.08 | 14.56 | 13.75 |
| 5.79 | 15.30 | 14.27 |
| 4.98 | 17.80 | 23.09 |
| 4.53 | 19.60 | 24.09 |
| 4.16 | 21.38 | 26.50 |
| 3.99 | 22.28 | 34.83 |
| 3.87 | 22.98 | 33.53 |
| 3.68 | 24.16 | 32.22 |
| 3.46 | 25.74 | 100.00 |
| 3.22 | 27.66 | 48.40 |
| 2.94 | 30.38 | 17.07 |

EXAMPLE 6

To water (47.212 g) was added sodium aluminate (1.43 g, technical grade, 74% solids) and sodium hydroxide (0.525 g). This mixture was stirred briefly to complete dissolution, then 1,8-diamino-p-menthane (3.753 g) was added. To this solution was added silica (Ultrasil, 9.127 g), and the resulting gel was transferred to a teflon liner, placed in an autoclave, pressurized (100 psig), sealed, then heated (95° C.) with stirring (~340 rpm) for 1 week. The final hydrogel is described by the moles ratios as follows:

| | |
|---|---|
| $SiO_2Al_2O_3$ | 21.54 |
| $OH^-/SiO_2$ | 0 |
| $R/SiO_2$ | 0.16 |
| $H_2O/SiO_2$ | 19.05 |
| $Na^+/SiO_2$ | 0.19 |

After cooling, the product was suction filtered, washed with water, then dried (110° C., in vacuo) to give a white powder (9.398 g). The X-ray diffraction pattern ($\lambda = 1.5418$) of the product proved it to be amorphous.

EXAMPLE 7

To water (47.218 g) was added sodium aluminate (0.29 g, technical grade, 74% solids) and sodium hydroxide (0.535 g). This mixture was stirred briefly to complete dissolution, then 1,8-diamino-p-menthane (7.528 g) was added. To this solution was added silica (Ultrasil, 9.121 g), and the resulting gel was transferred to a teflon liner, placed in an autoclave, pressurized (100 psig), sealed, then heated (175° C.) with stirring (~350 rpm) for 5 days. The final hydrogel is described by the moles ratios as follows:

| | |
|---|---|
| $SiO_2Al_2O_3$ | 101.77 |
| $OH^-/SiO_2$ | 0.08 |
| $R/SiO_2$ | 0.31 |
| $H_2O/SiO_2$ | 18.95 |
| $Na^+/SiO_2$ | 0.12 |

After cooling, the product was suction filtered, washed with water, then dried (110° C., in vacuo) to give a white powder (7.541 g). The X-ray diffraction pattern ($\lambda = 1.5418$) of the product proved it to contain some mordenite and a dense phase impurity, as shown in Table 10.

A portion of the as-synthesized product of this example was calcined at 538° C. for 10 hours. Table 11 shows the X-ray diffraction pattern of this calcined mordenite-containing material.

TABLE 10

| Interplanar d-Spacing (A) | Degrees 2-Theta | Relative Intensity |
|---|---|---|
| 13.56 | 6.52 | 11.52 |
| 10.24 | 8.64 | 6.29 |
| 9.06 | 9.76 | 18.68 |
| 6.57 | 13.48 | 16.32 |
| 5.78 | 15.32 | 7.94 |
| 4.52 | 19.62 | 13.39 |
| 4.28 | 20.74 | 34.87 |
| 4.09 | 21.72 | 100.00 |
| 3.99 | 22.30 | 36.21 |
| 3.83 | 23.22 | 10.45 |
| 3.76 | 23.68 | 6.73 |
| 3.46 | 25.72 | 23.31 |
| 3.35 | 26.58 | 76.76 |
| 3.22 | 27.70 | 15.64 |
| 3.14 | 28.38 | 6.25 |
| 2.89 | 30.98 | 8.73 |

TABLE 11

| Interplanar d-Spacing (A) | Degrees 2-Theta | Relative Intensity |
|---|---|---|
| 13.60 | 6.50 | 10.47 |
| 10.19 | 8.68 | 8.12 |
| 9.08 | 9.74 | 22.54 |
| 6.55 | 13.52 | 15.60 |
| 6.36 | 13.92 | 6.09 |
| 5.79 | 15.30 | 6.52 |
| 4.52 | 19.64 | 11.97 |
| 4.27 | 20.82 | 37.82 |
| 4.09 | 21.72 | 100.00 |
| 3.99 | 22.30 | 33.60 |
| 3.83 | 23.22 | 11.00 |
| 3.75 | 23.70 | 7.80 |
| 3.46 | 25.72 | 22.54 |
| 3.35 | 26.60 | 83.44 |
| 3.22 | 27.70 | 16.83 |
| 3.14 | 28.40 | 6.68 |
| 2.88 | 31.08 | 9.46 |

These examples demonstrate the present invention of synthesizing mordenite-type material from the required reaction mixture having a low alkalinity, low $YO_2/X_2O_3$ molar ratio and directing agent of 1,8-diamino-p-menthane. When the $YO_2/X_2O_3$ ratio in the reaction mixture is greater than about 70, a zeolite other than mordenite or other material composition begins to form. Synthesis conditions using a $YO_2/X_2O_3$, e.g. $SiO_2/Al_2O_3$, ratio at about 103 at low temperature (145° C.) for 1 week gave ZSM-5. Raising the temperature to 175° C. for 3 days at this $YO_2/X_2O_3$, e.g. $SiO_2/Al_2O_3$, ratio gave mostly a thermally unstable layered structure. Extending the crystallization time to 5 days at 175° C. gave some mordenite and a dense phase product mixture. Synthesis conditions using $YO_2/X_2O_3$, e.g. $SiO_2/Al_2O_3$, ratio near 21 either at low temperature (145° C.) for 1 week or higher temperature (175° C.) for 3 days gave high-silica mordenite. Lower $R/YO_2$ ratio (0.16) at this $YO_2/X_2O_3$, e.g. $SiO_2Al_2O_3$, ratio gave a mixture of mordenite and ZSM-5 at 145° C. for 1 week. These same ingredient ratios at 95° C. for 1 week gave only an amorphous product.

Changes and modifications in the specifically described embodiments can be carried out without departing from the scope of the invention which is intended to be limited only by the scope of the appended claims.

What is claimed is:

1. A method for synthesizing crystalline material exhibiting a characteristic X-ray diffraction pattern including d-spacing maxima values shown in Table 1 which comprises (i) preparing a mixture capable of forming said material, said mixture comprising sources of alkali or alkaline earth metal (M), an oxide of trivalent element (X), an oxide of tetravalent element (Y), water and directing agent (R) of 1,8-diamino-p-menthane, and having a composition, in terms of mole ratios, within the following ranges:

|  |  |
| --- | --- |
| $YO_2/X_2O_3$ | 1 to 70 |
| $H_2O/YO_2$ | 10 to 100 |
| $OH^-/YO_2$ | 0 to 0.25 |
| $M/YO_2$ | 0 to 2.0 |
| $R/YO_2$ | 0.10 to 2.0 |

(ii) maintaining said mixture under sufficient conditions including a temperature of from about 100° to about 200° C. until crystals of said material are formed; and (iii) recovering said crystalline material from step (ii), said recovered crystalline material containing said R.

2. The method of claim 1 wherein said mixture has the following composition ranges:

|  |  |
| --- | --- |
| $YO_2/X_2O_3$ | 10 to 30 |
| $H_2O/YO_2$ | 15 to 50 |
| $OH^-/YO_2$ | 0 to 0.1 |
| $M/YO_2$ | 0.10 to 1.0 |
| $R/YO_2$ | 0.16 to 1.0 |

3. The method of claim 1 wherein said mixture further comprises seed crystals in sufficient amount to enhance synthesis of said crystalline material.

4. The method of claim 3 wherein said seed crystals have the structure of mordenite.

5. The method of claim 1 wherein said X is aluminum, boron, iron, gallium, indium or a mixture thereof, and said Y is silicon, germanium, tin or a mixture thereof.

6. The method of claim 1 wherein X comprises aluminum and Y comprises silicon.

7. A mixture capable of forming crystals of mordenite structure upon crystallization, said mixture comprising sources of alkali or alkaline earth metal (M), trivalent element (X) oxide selected from the group consisting of oxide of aluminum, boron, iron, gallium, indium and mixtures thereof; tetravalent element (Y) oxide selected from the group consisting of oxide of silicon, germanium, tin and mixtures thereof; water and directing agent (R) of 1,8-diamino-p-menthane, and having a composition, in terms of mole ratios, within the following ranges:

|  |  |
| --- | --- |
| $YO_2/X_2O_3$ | 1 to 70 |
| $H_2O/YO_2$ | 10 to 100 |
| $OH^-/YO_2$ | 0 to 0.25 |
| $M/YO_2$ | 0 to 2.0 |
| $R/YO_2$ | 0.10 to 2.0 |

8. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

9. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

10. The method of claim 8 wherein said replacing ion is hydrogen or a hydrogen precursor.

11. The method of claim 9 wherein said replacing ion is hydrogen or a hydrogen precursor.

12. The recovered crystalline material of claim 1.

13. The recovered crystalline material of claim 2.

14. The R-containing product crystalline material of claim 8.

15. The R-containing product crystalline material of claim 9.

16. The R-containing product crystalline material of claim 10.

17. The R-containing product crystalline material of claim 11.

* * * * *